United States Patent
Chen

(10) Patent No.: US 9,340,407 B2
(45) Date of Patent: May 17, 2016

(54) CUSHION MANUFACTURING METHOD AND CUSHION

(71) Applicant: Forsound Corp., Kaohsiung (TW)

(72) Inventor: Fu-Chieng Chen, Kaohsiung (TW)

(73) Assignee: FORSOUND CORP., Kaohsiung (TW)

(*) Notice: Subject to any disclaimer, the term of this patent is extended or adjusted under 35 U.S.C. 154(b) by 0 days.

(21) Appl. No.: 14/202,496

(22) Filed: Mar. 10, 2014

(65) Prior Publication Data
US 2014/0363650 A1 Dec. 11, 2014

(30) Foreign Application Priority Data
Jun. 7, 2013 (TW) .............................. 102120365 A

(51) Int. Cl.
| | |
|---|---|
| *B32B 5/16* | (2006.01) |
| *B32B 5/18* | (2006.01) |
| *B29C 65/70* | (2006.01) |
| *B68G 5/02* | (2006.01) |

(Continued)

(52) U.S. Cl.
CPC .............. *B68G 11/04* (2013.01); *B29C 43/203* (2013.01); *B29C 65/70* (2013.01); *B29C 66/45* (2013.01); *B29D 99/0092* (2013.01); *B32B 3/08* (2013.01); *B32B 5/16* (2013.01); *B32B 5/18* (2013.01); *B32B 5/30* (2013.01); *B32B 7/02* (2013.01); *B32B 38/1866* (2013.01); *B68G 5/02* (2013.01); *B68G 7/052* (2013.01); *B32B 38/0036* (2013.01); *B32B 2250/03* (2013.01); *B32B 2264/0292* (2013.01); *B32B 2266/025* (2013.01); *B32B 2323/04* (2013.01); *B32B 2323/10* (2013.01); *B32B 2601/00* (2013.01); *Y10T 428/24983* (2015.01)

(58) Field of Classification Search
CPC .............. B32B 3/08; B32B 5/16; B32B 5/18; B32B 5/30; B32B 5/32; B32B 38/1866; B32B 2250/03; B32B 2250/22; B32B 2250/24; B32B 2264/0292; B32B 2266/025; B32B 2266/0278; B32B 2305/22; B32B 2601/00; B29C 43/203; B29C 43/206; B29C 65/70; B29C 66/45; B29D 99/0092; B68G 5/02
See application file for complete search history.

(56) References Cited

U.S. PATENT DOCUMENTS

| | | | |
|---|---|---|---|
| 3,939,508 A | * | 2/1976 | Hall et al. .......................... 5/727 |
| 4,639,363 A | | 1/1987 | Komatsu et al. |

(Continued)

FOREIGN PATENT DOCUMENTS

| | | | |
|---|---|---|---|
| JP | 03-277537 A | * | 12/1991 |
| JP | 2011-245340 A | * | 12/2011 |

*Primary Examiner* — Michael Tolin
(74) *Attorney, Agent, or Firm* — Ming Chow; Sinorica, LLC

(57) ABSTRACT

A method of manufacturing a cushion and a cushion structure are disclosed. The manufacturing method includes employing a first sheet structure that is the cross-linked foamed polyethylene (PE) or cross-linked foamed polypropylene (PP) in material with the first sheet structure serving as an inner layer and an outer layer of the cushion structure. The method further includes crushing PU foam and adding an adhesive to the crushed PU foam before compressing the crushed PU foam and the adhesive to a second sheet structure, which is called "synthetic foam" functioning as an intermediate layer of the cushion structure. The multi-layer cushion structure may be prepared after having the outer layer, the intermediate layer and the inner layer integrated together using laminating, before being placed in an oven for heating until the inner layer and the outer layer are tendered and in a shape-mold of a molding machine for pressurizing.

3 Claims, 10 Drawing Sheets

(51) Int. Cl.
*B68G 11/04* (2006.01)
*B32B 7/02* (2006.01)
*B68G 7/052* (2006.01)
*B32B 3/08* (2006.01)
*B32B 5/30* (2006.01)
*B29C 43/20* (2006.01)
*B29C 65/00* (2006.01)
*B29D 99/00* (2010.01)
*B32B 38/18* (2006.01)
*B32B 38/00* (2006.01)

(56) References Cited

U.S. PATENT DOCUMENTS

| | | | |
|---|---|---|---|
| 5,762,735 A * | 6/1998 | Collins et al. | 156/78 |
| 2004/0055223 A1 | 3/2004 | Ono et al. | |
| 2006/0210789 A1 | 9/2006 | Ko | |

* cited by examiner

CUSHION MANUFACTURING METHOD AND CUSHION

BACKGROUND

1. Field of the Invention

The present disclosure relates to a manufacturing method for a cushion made of cross-linked foamed material and synthetic foam and the cushion itself. Because the cross-linked foam material could provide the desired supporting force in addition to ductility and strength, the cushion could achieve the goal of desired pressure diverting and buffering, when the cross-linked foam material is integrated with the synthetic foam.

2. Description of Related Art

Ordinary people in modern days typically lack sufficient amount of exercise for some reasons, and could maintain the same or similar posture for an extended period of time to meet the requirement of their work, which may subject themselves to back-related aches. In addition to stretching frequently, properly posturing and having the adequate support provided to the human body or even minimizing the source of the pressure may help mitigate the back-related aches. For staying healthy or being comfortable, a variety of soft cushion for supporting the human body has been inseparable part of our daily life. The cushions could be for supporting/comforting the waist, the hip, the back, or the head of the user.

Traditional soft cushions are made of a variety of materials and in multiple structural designs to serve the purpose of supporting, pressure diverting, and buffering. Such cushions could be made of sponge or foam substance and vary from cushion to cushion because of the material they adopt. When used to support the different body portions, the cushions may differ in shape thought most of them are made of PU material. However, the PU material still has some to be desired. For example, the supportiveness associated with the PU material does not always meet the needs and the deformation of the cushions made in the PU material may subject to some deformation when used in a short while. Thus, the adequate support for the user may not be obtained in the traditional cushions.

In addition, please refer to US 2004/0055223, U.S. Pat. No. 4,039,363 and US2006/0210789. Despite each of the above-mentioned background introduction discloses a three-layer structure, they all fail to teach or suggest the structure having the synthetic foam sandwiched by cross-linked PP or cross-linked PE.

Since the cross-linked foamed material is light in weight, strong in structural support, good in ductility, and easy in being processed, the supportiveness of the cushion using the cross-linked foam material and the synthetic foam could enhance the support and avoid the deformation in the short period. The synthetic foam when used as the intermediate layer of the cushion structure could further divert the pressure/force. The combination of the cross-linked foam material and the synthetic foam could be remedying the problems of the traditional arts.

SUMMARY OF THE DISCLOSURE

The present disclosure is to provide a manufacturing method of a cushion structure and the cushion structure itself. By using the cross-linked foamed material, the cushion structure may be offering the desired supportiveness. The combination of synthetic foam as an intermediate layer of the cushion structure and the cross-linked foamed material used in an inner layer and an outer layer diverts the pressure in a more efficient way in addition to better supporting performance.

The manufacturing method may include employing a first sheet structure that is the cross-linked foamed polyethylene (PE) or cross-linked foamed polypropylene (PP) in material with a foaming ratio ranging from 3-30 and 3-10 millimeters in thickness. The first sheet structure functions as an outer layer of the cushion. The method may also include crushing a PU foam and adding an adhesive to the crushed PU foam before compressing the crushed PU foam and the adhesive to a second sheet structure, which is called "synthetic foam" functioning as an intermediate layer, reusing the cross-linked foamed PE or the cross-linked foamed PP with the foaming ratio standing ranging from 3-30 and 3-30 millimeters in thickness as an inner layer, and integrating the outer layer, the intermediate layer and the inner layer into a multi-layer structure using laminating. The method may further include placing the multi-layer structure in an oven and heating the multi-layer structure until the inner layer and the outer layer have been tendered before placing the multi-layer structure with the tendered inner layer and the tendered outer layer in a shape-mold of a molding machine, which pressurizes and let molded cushion cooled down to the cushion with curvature to be suitable for an user's waist, neck, back and head support.

More specifically, the foaming ratio for the cross-linked foamed PE or the cross-linked foamed PP used in the inner layer and the outer layer ranges from 3 to 8.

More specifically, the oven may operate between 150 degrees to 180 degrees Celsius when heating the multi-layer cushion (structure).

More specifically, after the multi-layer structure been shaped the manufacturing method may also include incorporating a shock-absorbing layer into a surface of the inner layer by adhesively sticking the shock-absorbing layer to the surface of the inner layer.

More specifically, the shock-absorbing layer is a gel, a memory foam, a foam, a combination thereof.

The cushion according to one embodiment of the present disclosure may include an inner layer, which is a sheet structure made of a cross-linked foam material with a foaming ratio ranging from 3 to 30, an outer layer, which is a sheet structure made of the cross-linked foam material with the foaming ratio ranging from 3 to 30, and an intermediate layer, which is a sheet structure formed by an synthetic foam and positioned between the inner layer and the outer layer. The outer layer and the inner layer may be greater than the intermediate layer in hardness, and the inner and outer layers is greater than the hardness of the intermediate layer in structure to form a multi-layer structure having one single tender layer sandwiched by two robust layers.

More specifically, the cross-linked foam material is cross-linked foam polyethylene (PE) or cross-linked foam polypropylene (PP).

More specifically, the intermediate layer is implemented in terms of EVA foam material, the cross-linked foam PE with the foaming ratio ranging from 15-35, or the cross-linked foamed PP with the foaming ratio ranging from 15-35.

More specifically, the intermediate layer is a multi-layer structure.

More specifically, the thickness of the intermediate layer is larger than that of the inner layer and the outer layer.

A cushion structure according to another embodiment of the present disclosure may include an inner layer, which is a sheet structure made of a cross-linked foam material with a foaming ratio ranging from 3 to 30, an outer layer, which is a sheet structure made of the cross-linked foam material with the foaming ratio ranging from 3 to 30, an intermediate layer, which is a sheet structure formed by an synthetic foam and positioned between the inner layer and the outer layer, with the outer layer and the inner layer greater than the intermediate layer in hardness. The inner and outer layers may be greater than the hardness of the intermediate layer in structure to form a multi-layer structure having one single tender layer sandwiched by two robust layers. Plus, the cushion may also include a shock-absorbing layer incorporated into the inner layer.

More specifically, the inner layer has at least recess formed in which the shock-absorbing layer is placed.

More specifically, the shock-absorbing layer is integrated onto the surface of the inner layer.

More specifically, the shock-absorbing layer is a gel, a memory foam, a PU foam, or a combination thereof.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DESCRIPTION OF THE EXEMPLARY EMBODIMENTS

The aforementioned and other technical contents, features, and efficacies will be shown in the following detail descriptions of a preferred embodiment corresponding with the reference Figures.

Figure 8:
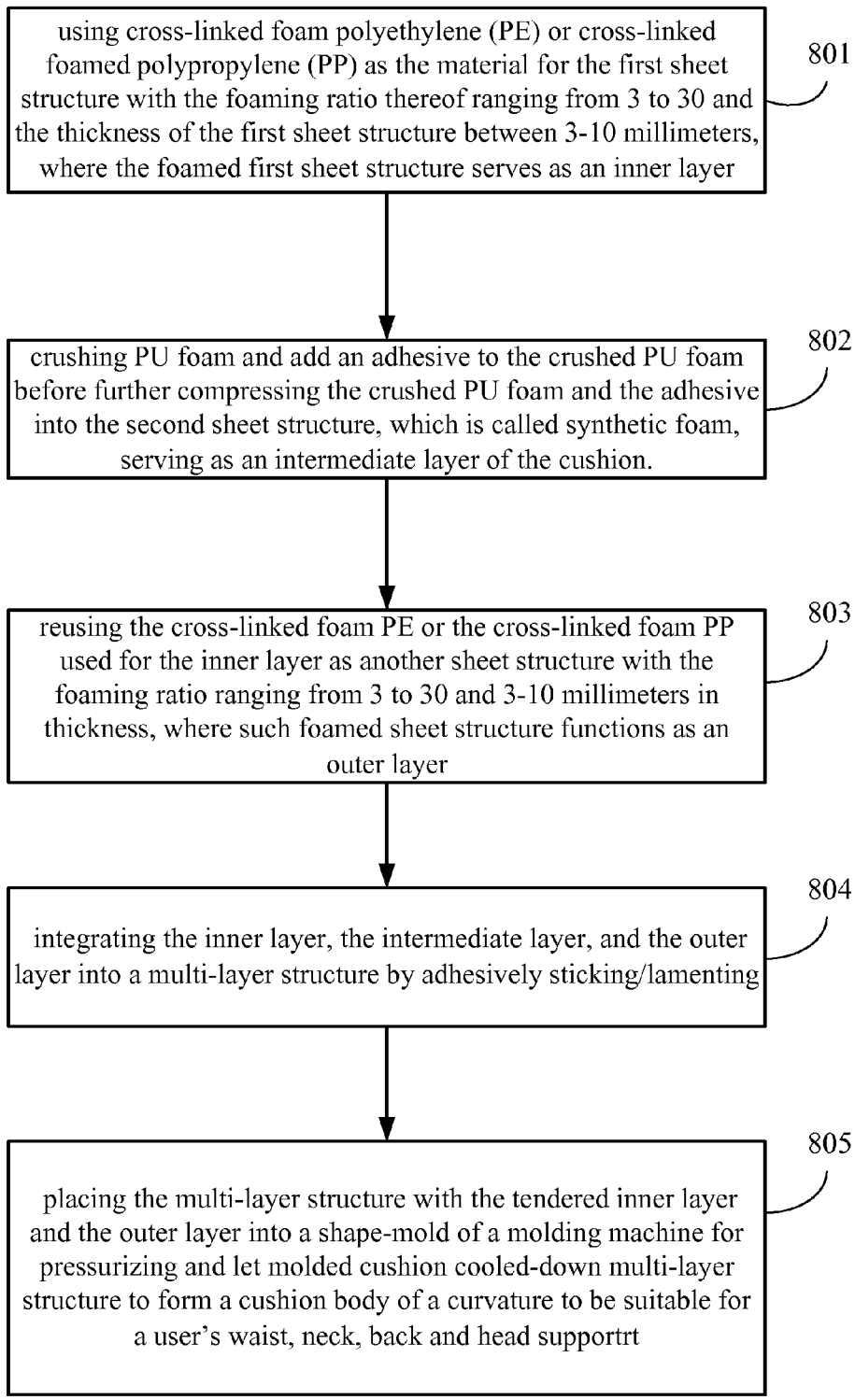
FIG. 8 shows a manufacturing method of a cushion structure according to one embodiment of the present disclosure.

Please refer to FIG. 8 illustrative of a flow chart showing a cushion manufacturing method according to one embodiment of the present invention. The manufacturing method may include using cross-linked foam polyethylene (PE) or cross-linked foamed polypropylene (PP) as the material for a first sheet structure (step 1). The foaming ratio of the first sheet structure in one implementation may range from 3 to 30 and the thickness of the first sheet structure may be between 3-10 millimeters. The foamed first sheet structure may serve as an inner layer 801. In one preferred embodiment, the foaming ration of the first sheet structure as the inner layer of the cushion structure may be between 3 and 8. In step 2, the manufacturing method may crush PU foam and add an adhesive to the crushed PU foam before further compressing the crushed PU foam and the adhesive into a second sheet structure serving as an intermediate layer 802, which is called "synthetic foam" of the cushion. In step 3, the method may reuse the cross-linked foam PE or the cross-linked foam PP used for the inner layer as another sheet structure. Such sheet structure may be associated with the foaming ratio ranging from 3 to 30 and 3-10 millimeters in thickness. The foamed sheet structure may function as an outer layer 803. The foaming ratio for the cross-linked foamed material for the inner layer may be between 3 and 8. The manufacturing method may also include step 4 for integrating the inner layer, the intermediate layer, and the outer layer into a multi-layer structure 804 by adhesively sticking/lamenting. In step 5, the method may further placing the multi-layer structure into an oven for heating the multi-layer structure until after the inner layer and the outer layer are tendered, before placing the multi-layer structure with the tendered inner layer and the outer layer into a shape-mold of a molding machine for pressurizing and let molded cushion cooled-down multi-layer structure to form a cushion body 805 of a curvature to be suitable for a user's waist, neck, back and head support. If the shape-mold of a molding machine is for producing the structure ergonomically suitable for the waist of the human body, the end product cushion structure could be of the waist curvature in shape. When the shape-mold of a molding machine is devoted to the production of the structure suitable for the back, neck or head of the human body, the produced cushion structure may be of the curvature facilitating the support or enhancing the user experience for such body portion.

In one implementation, the thickness of the sheet structure as the inner layer and the sheet structure as the outer layer may be from 5-10 millimeters, though they could be ranging from 3 to 15 millimeters in thickness in another implementation.

Figure 1:
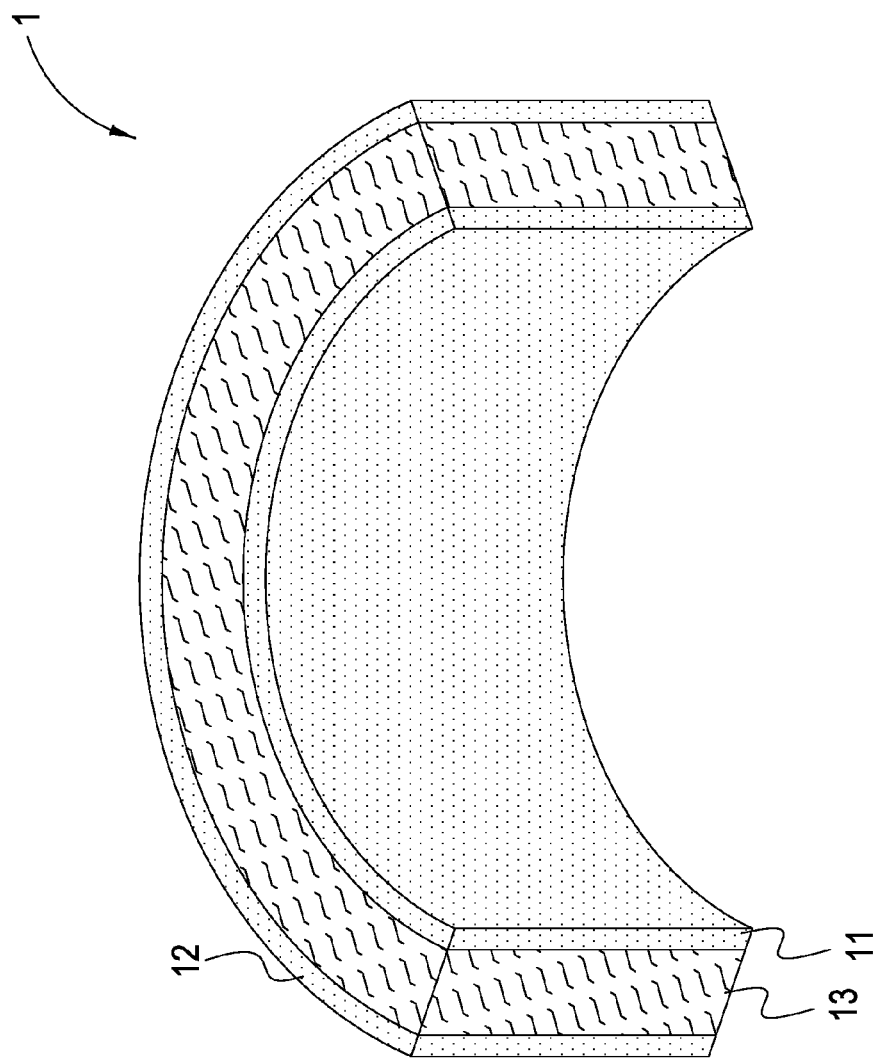
FIG. 1 shows a schematic diagram of a cushion structure according to the first embodiment of the present disclosure.

In conjunction with the manufacturing method illustrated in above, please refer to FIG. 1 showing a cushion body produced following such manufacturing method according to one embodiment of the present invention. Such cushion structure 1 may include an inner layer 11, an outer layer 12, and an intermediate layer 13. The inner layer 11 and the outer layer 12 may be implemented in a sheet structure that is a cross-linked foaming material associated with a foaming ratio between 3 and 30. The thickness of the inner layer 11 and the outer layer 12 may be between 3 to 10 millimeters. The intermediate layer, meanwhile, may be implemented in the form of another sheet structure that is synthetic foam and sandwiched between the inner layer 11 and the outer layer 12. The hardness of the inner layer 11 and the outer layer 12 is larger than that of the intermediate layer 13, forming a multi-layer structure with two robust layers clamping one tender layer. Further, the thickness of the intermediate layer 13 is larger than that of the inner layer 11 and the outer layer 11. Since the cross-linked foam may be harder after foaming, stable support may be provided to reduce the likelihood of the cushion structure 1 being significantly deformed. Thus, it may become suitable to place such cushion structure 1 that is made of the foamed cross-linked material in the proximity of the waist, back, neck or head for better support. The overall performance in support may not be negatively affected because of the thinner inner layer 11 and outer layer 12. And the larger thickness of the intermediate layer 13 may be helpful in diverting the pressure applied to the cushion structure and in providing the adequate buffer. When the user leans against the surface of the inner layer 11, the exerted force going downwardly may transfer from the inner layer 11 to the intermediate layer 13, which in turn may transfer the same to the outer layer 12. Since the outer layer 12 is sufficiently robust, such force may bounce back to the intermediate layer 13. Accordingly, the force applied to the cushion structure 1 may be offset by the inner layer 11 and the outer layer 12 being robust to provide the adequate support counter force, minimizing the occurrence of the cushion structure 1 of being deformed. The intermediate layer 13 may further function to divert the force/pressure and buffer, enhancing the user experience.

The present invention employs the cross-linked foam PE or the cross-linked foam PP, and either is good in ductility, strength and supportiveness in addition to being durable, light, and environmentally friendly. PU foam or EVA foam material may be used to replace the synthetic foam as the material making the intermediate layer 13. The synthetic foam may be prepared by having the fragments of the foam further sliced evenly, before adding the adhesives and compressing the same into the foam material in larger density. Such foam material may be further sliced into flakes.

Figure 2:
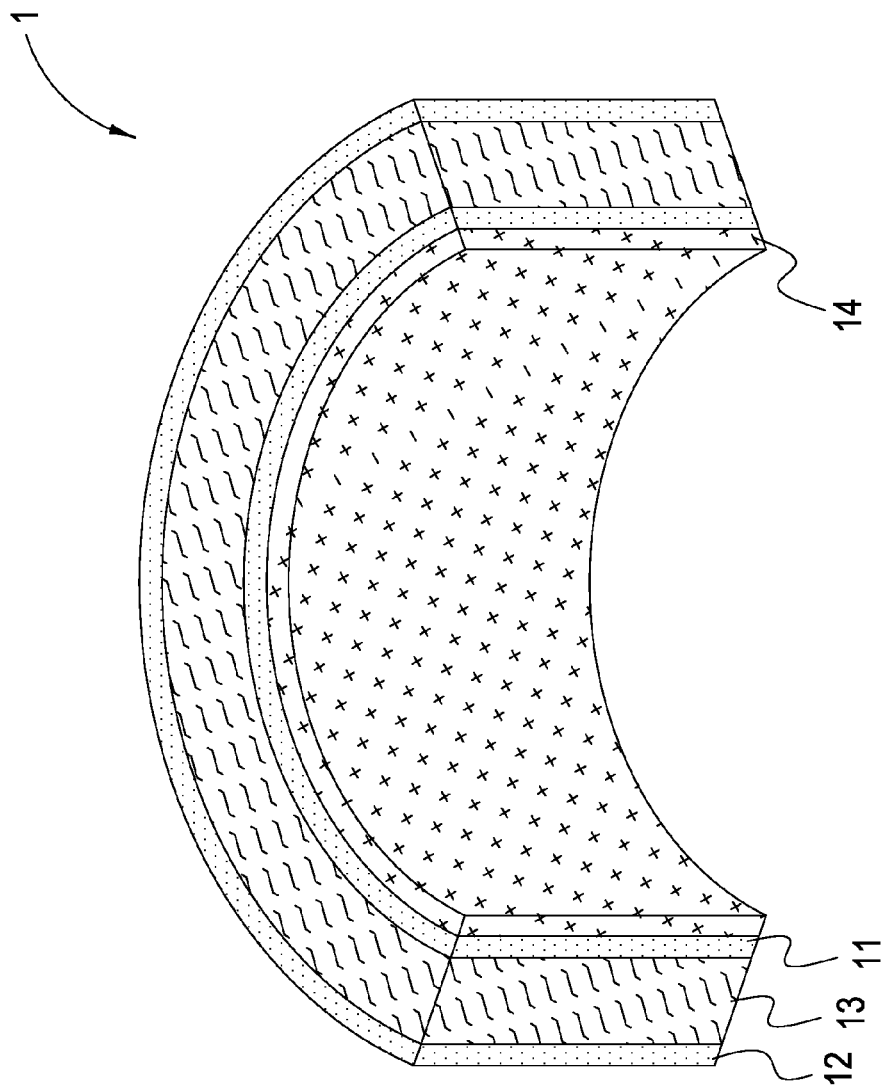
FIG. 2 shows a schematic diagram of a cushion structure according to the second embodiment of the present disclosure.

One shock-absorbing layer 14 may be disposed onto the surface of the inner layer 14 as shown in FIG. 2. The shock-absorbing layer 14 may be selected from a group consisting of a solid gel, memory foam, PU foam, and a combination thereof. When the user lies on the absorbing layer 14, the shock-absorbing layer 14 may function along with the inner layer 11, the outer layer 12, and the intermediate layer 13 underneath the shock-absorbing layer 14 to provide the excellent pressure-absorbing and the buffering, in addition to superior ductility, strength and supportiveness. When the absorbing layer 14 is made of the gel, the refreshing and the coolness associated with the gel may further enhance the user experience.

Figure 3A:
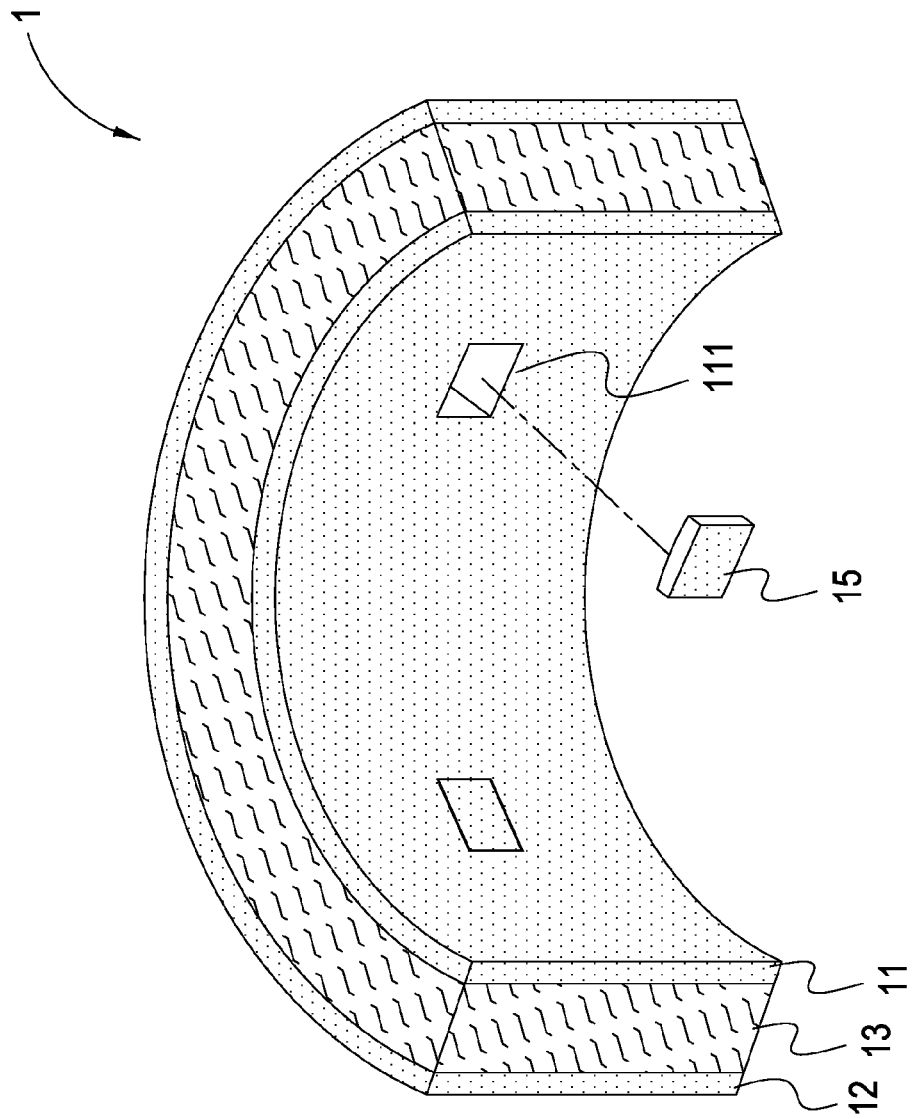
FIG. 3A shows a schematic diagram of a cushion structure according to the third embodiment of the present disclosure.
Figure 3B:
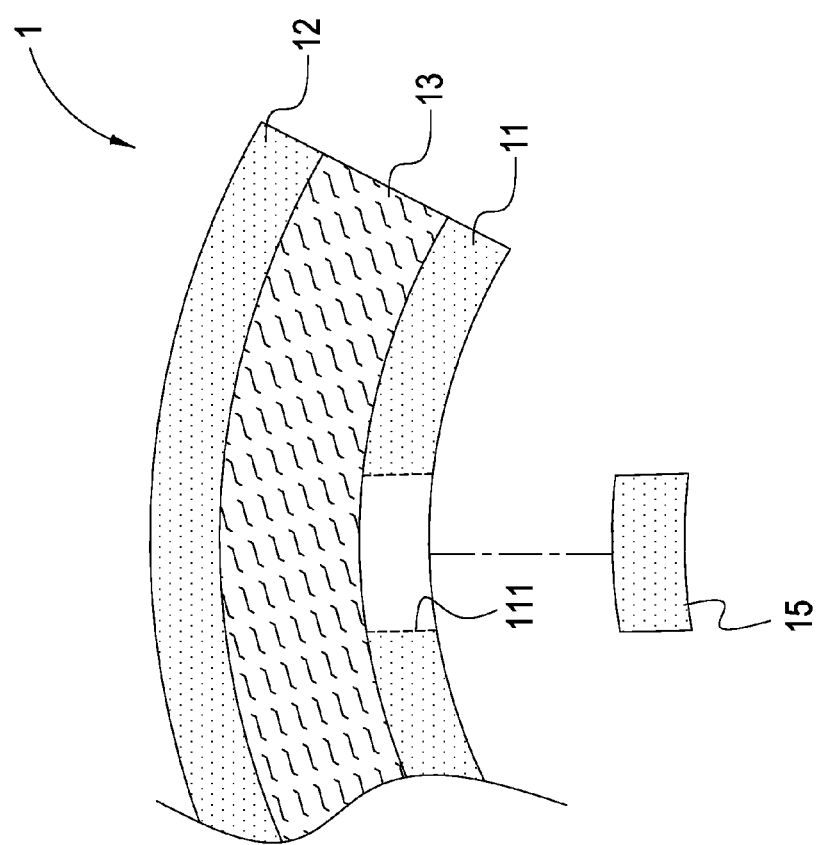
FIG. 3B shows a cross-sectional view of the third embodiment of the present disclosure.

Plus, a recess 111 may be formed on the surface of the inner layer 11 and another shock-absorbing layer 15 may be placed into the recess 111. As shown in FIGS. 3A and 3B, two recesses 111 corresponding to the waist of the user may be formed for the cushion structure, with one of the recesses 111 (not actually shown in the figure) having the shock-absorbing layer 15 incorporated when the other is without any shock-absorbing layer 15. With the two shock-absorbing layers 15, the shock absorbing at the location where the shock-absorbing layers are placed may improve. When the user leans against the cushion structure 1, the waist of the user may be flanked by the shock-absorbing layers 15. Since the shock-absorbing layer is a tendered layer compared to the inner layer 11, the shock-absorbing layer 15 could be providing the user body area when in contact with the shock-absorbing layer 15 with the desired pressure-diverting and buffering.

Figure 4:
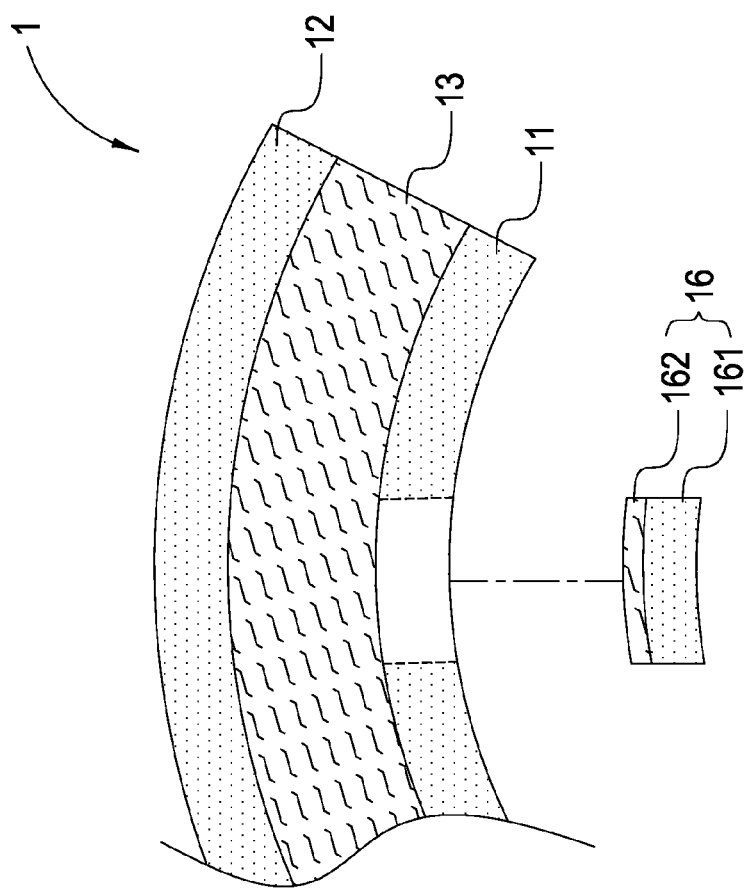
FIG. 4 shows a schematic diagram of a cushion structure according to the fourth embodiment of the present disclosure.

The cushion structure in FIG. 3A may suggest that in the case that the gel serves as the material for the shock-absorbing layer one shaping material may become necessary because of the characteristic of the gel. As shown in FIG. 4, when the shock-absorbing layer 16 consists of gel 161 and foam 162 the gel 161 may be attached on the surface of the foam 162 so that the shock-absorbing layer could be placed within the recess 111.

Figure 5:
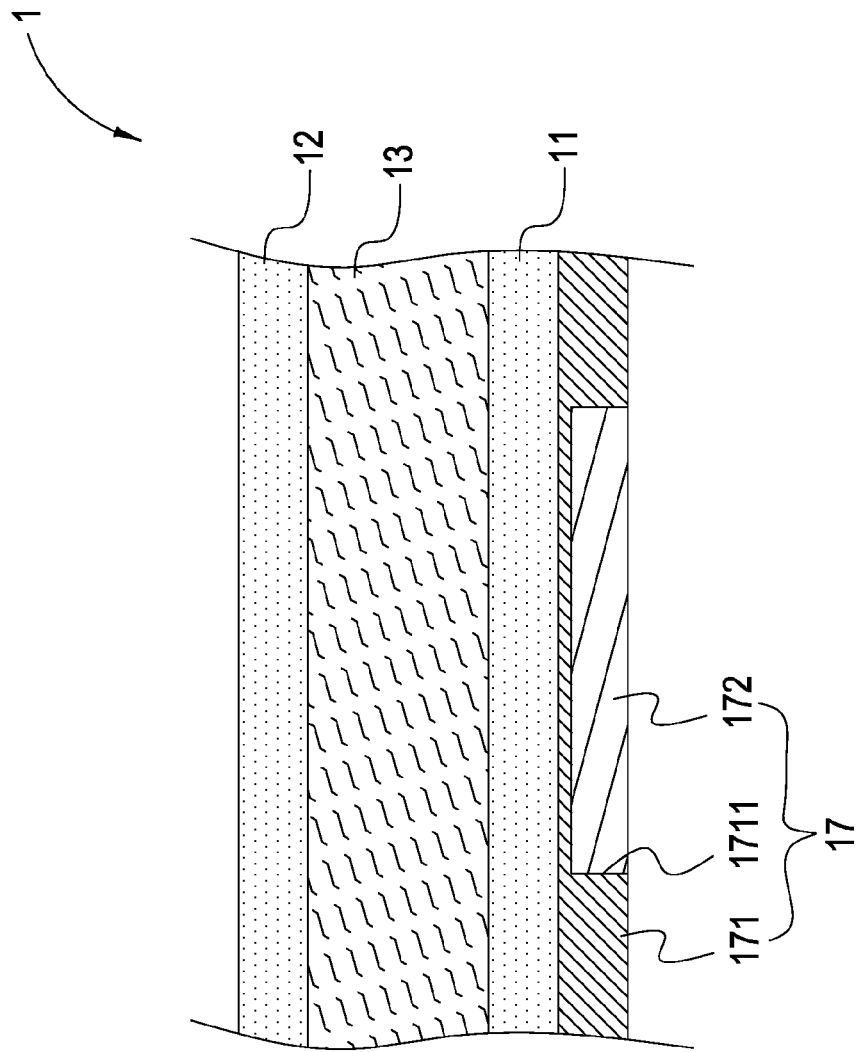
FIG. 5 shows a schematic diagram of a cushion structure according to the fifth embodiment of the present disclosure.

In addition to the example of the shock-absorbing layer 16 constituted by the gel 161 and the foam 162, another example may have another recess 1711 formed at the center of foam 171 (shown in FIG. 5). And the gel 172 may be filled into the recess 1711 to form the shock-absorbing layer 17, which may be integrated onto the surface of the inner layer 11.

Figure 6:
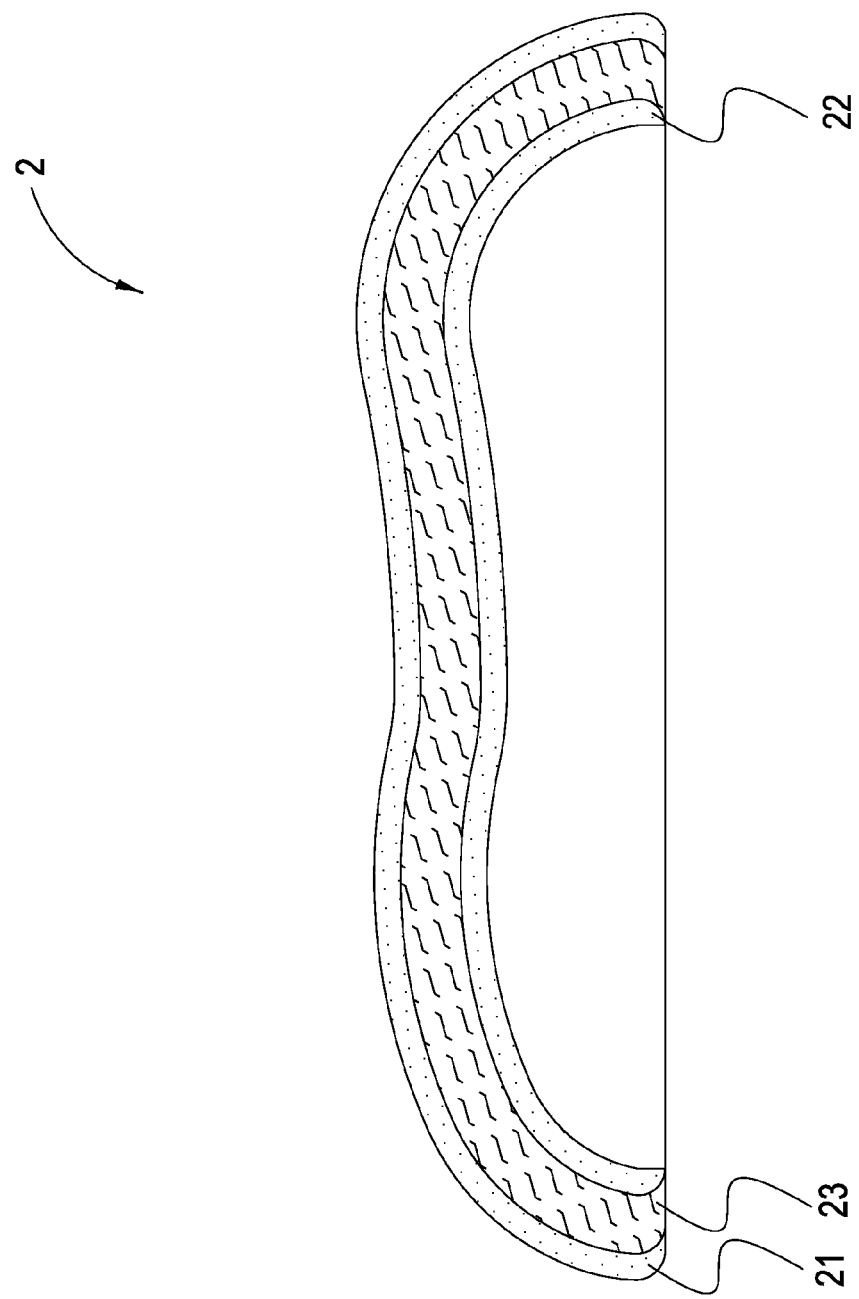
FIG. 6 shows a schematic diagram of a cushion structure according to the sixth embodiment of the present disclosure.
Figure 7:
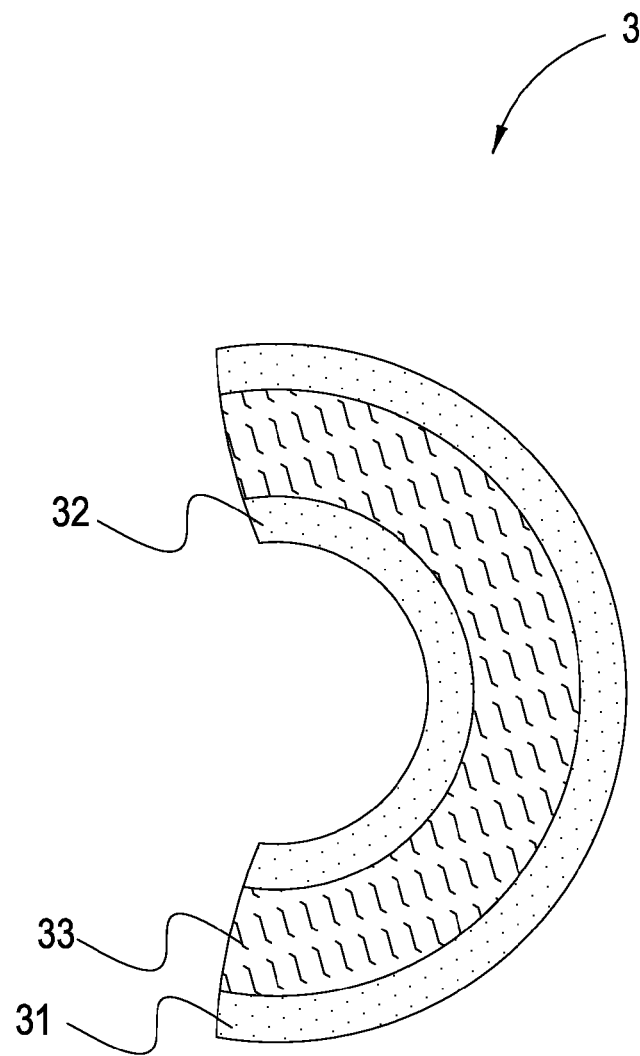
FIG. 7 shows a schematic diagram of a cushion structure according to the seventh embodiment of the present disclosure.
Figure 9:
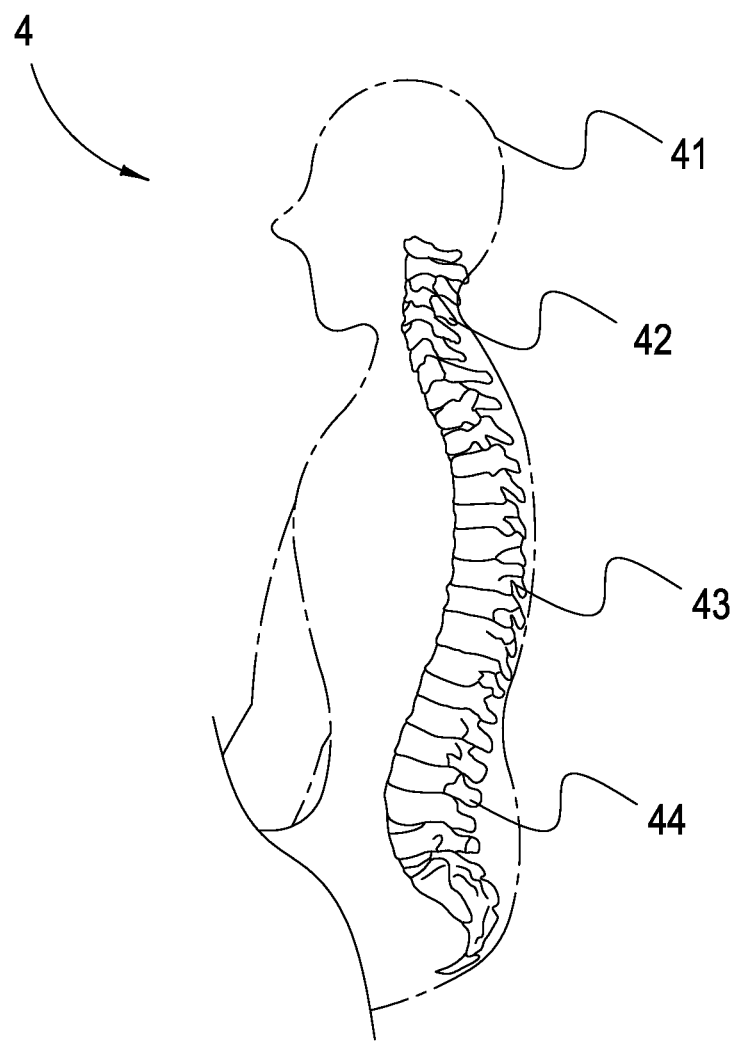
FIG. 9 illustrates body portions to which the cushion structure may be suitable according to one embodiment of the present disclosure.

Above five examples are based on a cushion structure suitable for the user's waist. In conjunction with FIG. 9 illustrating a human body, the cushion structure suitable for the user's waist (lumbar 44) when in use could be in match with the curvature of the user's waist (or lumbar 44). As previously mentioned, the cushion structure may be prepared for supporting the back, head, or neck of the human body. As shown in FIG. 6 where a cushion structure 2 is used for the head support. Such cushion structure 2 may also include an inner layer 21, an outer layer 22 and an intermediate layer 23. The cushion structure 2 could be of the curvature offering certain support to the head 41 of the human body 4 shown in FIG. 9. Plus, FIG. 7 illustrates another embodiment of the present invention where a cushion structure 3 is for the neck support. The cushion structure 3 may also include an inner layer 31, an outer layer 32 and an intermediate layer 33. Considering the cushion structure 3 may be suitable for the neck support, the cushion structure 3 may be shaped to be of the curvature of cervical spine 42 (shown in FIG. 9) in order to be supportive of and stabilizing the same. Further, the cushion system according to the present invention may also be shaped for the user to lean against or of the curvature of the back 43 of the user body 4.

The present invention provides the manufacturing method for the cushion and the structure of the same. When compared to the traditional approaches, the present invention may have the following advantages:

(1) by using the cross-linked foam material as the inner layer and the outer layer of the cushion and integrating such with the synthetic foam, the resulting cushion may be light in weight, strong in structural support, and relatively cost-effective since mixing the cross-linked foam material with the synthetic foam together to manufacture the cushion could enhance the ductility, strength and support force, minimizing the occurrence of the deformation of the cushion and improving the buffering performance because of the synthetic foam as the intermediate layer; and (2) by using the shape-mold of a molding machines capable of shaping the curvature of different body portions such as the back, neck, or head the resulting cushion could be tailored to be with different curvature to be used for different portions of the human body to improve the user experience.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A method of manufacturing a cushion, comprising:
providing a first sheet comprising a material selected from the group consisting of cross-linked foamed polyethylene (PE) and cross-linked foamed polypropylene (PP), wherein the first sheet has a foaming ratio of 3-30 and a thickness of 3-10 millimeters, wherein the first sheet functions as an outer layer of the cushion;
forming a second sheet by performing the steps of crushing polyurethane (PU) foam, adding an adhesive to the crushed PU foam, and then compressing the crushed PU foam and the adhesive to form the second sheet, wherein the second sheet is a synthetic foam which functions as an intermediate layer of the cushion;
providing a third sheet comprising a material selected from the group consisting of cross-linked foamed polyethylene (PE) and cross-linked foamed polypropylene (PP), wherein the third sheet has a foaming ratio of 3-30 and a thickness of 3-30 millimeters, wherein the third sheet functions as an inner layer of the cushion;

laminating the outer layer, the intermediate layer and the inner layer to form a multi-layer structure;

placing the multi-layer structure in an oven and heating the multi-layer structure to soften the inner layer and the outer layer;

placing the heated multi-layer structure having softened inner and outer layers in a mold;

pressing the heated multi-layer structure in the mold to form a shaped multi-layer structure, wherein the shaped multi-layer structure has a curvature suitable to support a user's waist, neck, back or head; and cooling the shaped multi-layer structure to form the cushion.

2. The manufacturing method according to claim 1, wherein the foaming ratio of the first sheet is 3-8 and the foaming ratio of the third sheet is 3-8.

3. The manufacturing method according to claim 1, further comprising:

incorporating a shock-absorbing layer into a surface of the inner layer by adhering the shock-absorbing layer to the surface of the inner layer, wherein the shock-absorbing layer comprises a material selected from the group consisting of a gel, a memory foam, a foam, and a combination thereof.

* * * * *